May 14, 1957 H. A. BERNREUTER 2,792,549
ELECTRIC METER ASSEMBLIES
Filed July 21, 1953 6 Sheets-Sheet 1
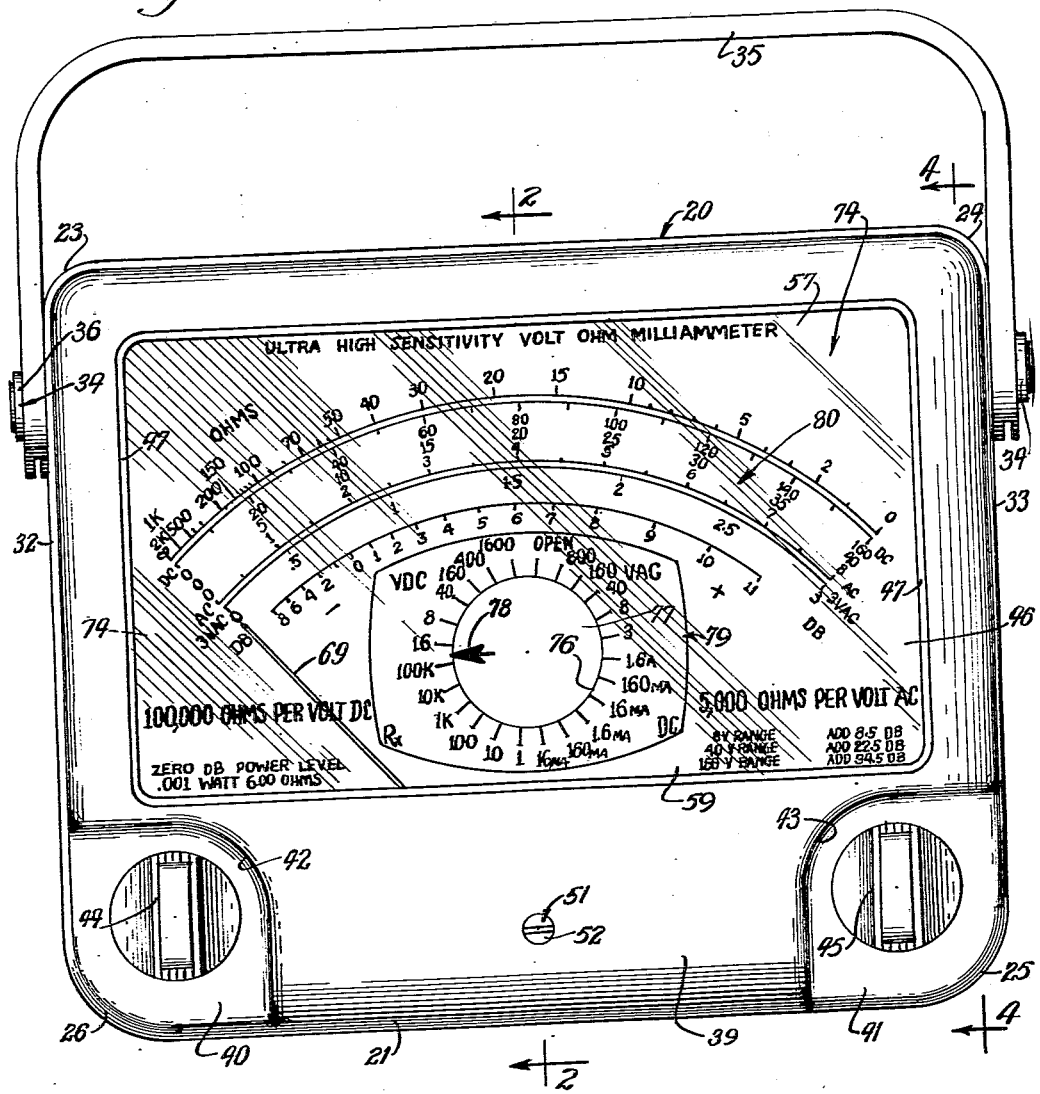
INVENTOR.
Herbert A. Bernreuter
BY
Robert H. Wendt
Atty.

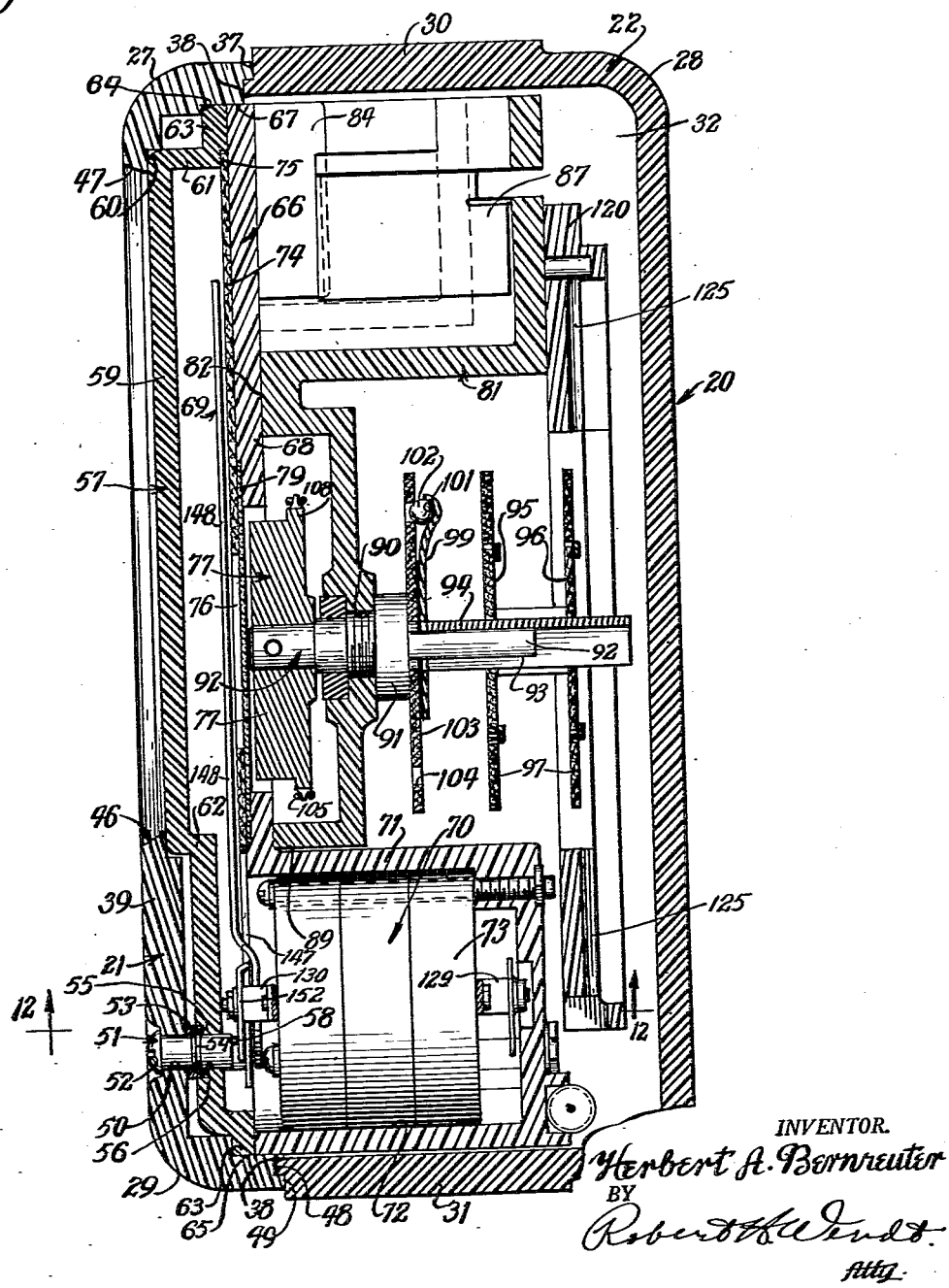

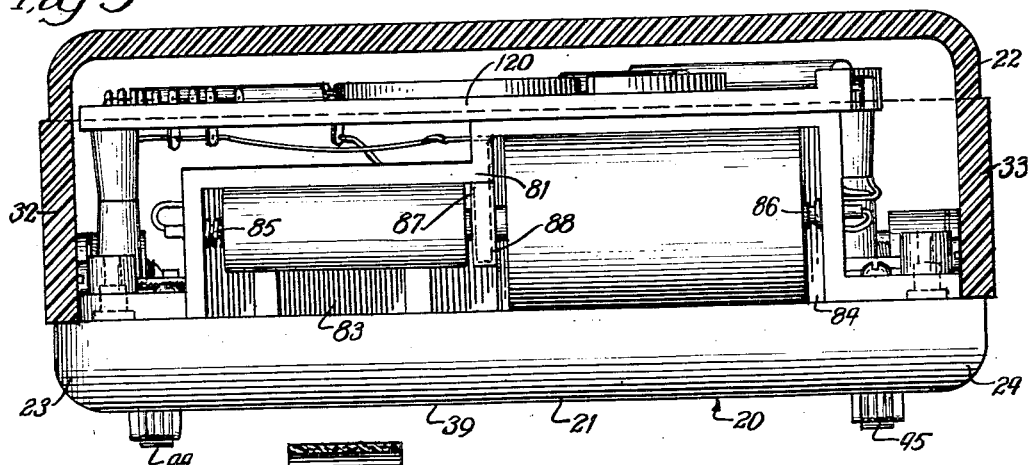
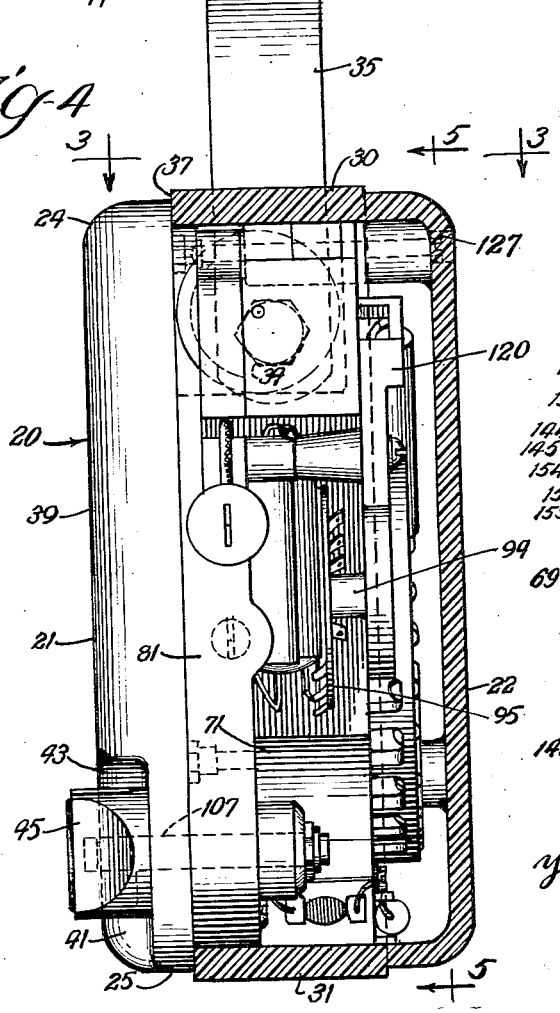
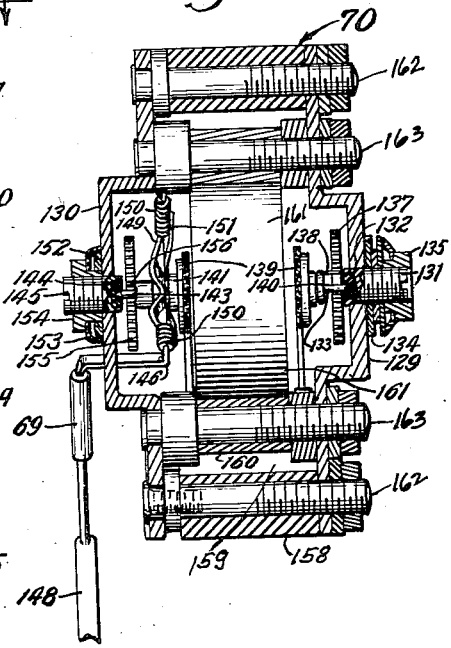

May 14, 1957  H. A. BERNREUTER  2,792,549
ELECTRIC METER ASSEMBLIES
Filed July 21, 1953  6 Sheets-Sheet 4

INVENTOR.
Herbert A. Bernreuter
BY
Robert H. Wendt
Atty.

May 14, 1957  H. A. BERNREUTER  2,792,549
ELECTRIC METER ASSEMBLIES
Filed July 21, 1953  6 Sheets-Sheet 5

INVENTOR.
Herbert A. Bernreuter
BY
Robert H. Wendt
Atty.

May 14, 1957  H. A. BERNREUTER  2,792,549
ELECTRIC METER ASSEMBLIES
Filed July 21, 1953  6 Sheets-Sheet 6
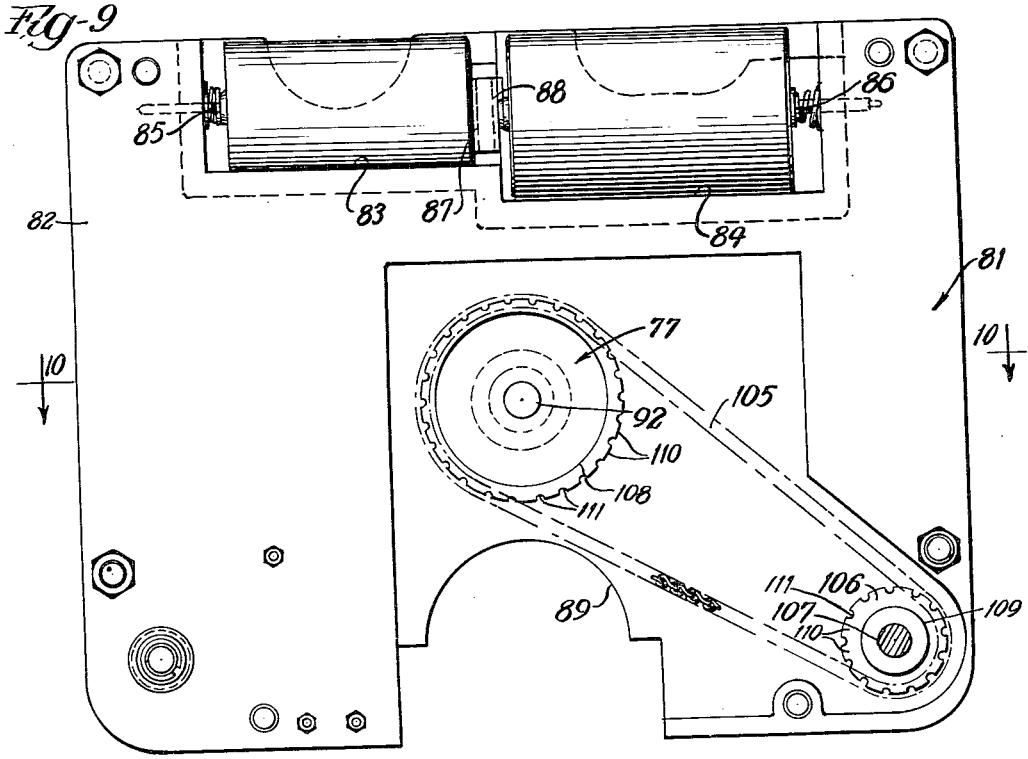
INVENTOR.
Herbert A. Bernreuter
BY
Robert H. Wendt
Atty.

United States Patent Office 2,792,549
Patented May 14, 1957

2,792,549

ELECTRIC METER ASSEMBLIES

Herbert A. Bernreuter, Elmwood Park, Ill., assignor to American Gage & Machine Company, Chicago, Ill., a corporation of Illinois Application July 21, 1953, Serial No. 369,283

5 Claims. (Cl. 324—156)

The present invention relates to electric meter assemblies, and is particularly concerned with the electric meter assemblies of the type utilizing a single movement for measuring a multiplicity of electrical currents, voltages or other variables by providing various ranges of measurement and scales on a single dial plate.

One of the objects of the invention is the provision of an improved meter assembly of the class described, which is more sensitive than the devices of the prior art, which is shielded and which may be manufactured at a low cost.

Another object of the invention is the provision of an improved meter assembly including a meter movement and a plurality of multipliers, dividers, potentiometers and other electrical units in which the assembly is provided with a single dial plate showing the scales for the needle and also showing the indicator for an indexing switch by means of which the movement is connected in circuit with electrical units to accomplish the measurements that are indicated on the corresponding scale.

In the past it has been the custom to provide indicia for such an indexing switch on the outside of the molded housing which involves the making of an especial mold bearing such indicia; but the present meter assembly has the advantage that all of the indicia, both for the meter scale and the indexing switch are included on a single dial plate which does not involve the provision of a new mold whenever additional switch positions are desired for the indexing switch.

Other objects and advantages of the invention will be apparent from the following description and the accompanying drawings, in which similar characters of reference indicate similar parts throughout the several views.

Referring to the six sheets of drawings accompanying this specification,

Fig. 1 is a front plan view of the present meter assembly taken with the meter lying on its back cover;

Fig. 2 is a fragmentary sectional view taken on the plane of the line 2—2 of Fig. 1, looking in the direction of the arrows;

Fig. 3 is an end view in partial section taken on the plane of the line 3—3 of Fig. 4, looking in the direction of the arrows;

Fig. 4 is a side elevational view taken from the right side of Fig. 1 in partial section on the plane of the line 4—4 of Fig. 1;

Fig. 9 is a plan view of a subpanel used for supporting dry batteries and the driving mechanism for an indexing switch;

Fig. 10 is a fragmentary sectional view taken on the plane of the lines 10—10 of Fig. 9, looking in the direction of the arrows;

Fig. 11 is an exploded fragmentary view showing a fragment of the driven gear and of the chain which drives the indicator for the indexing switch;

Fig. 12 is an axial sectional view taken through the meter movement which is preferably employed in the present instrument.

Figure 5:
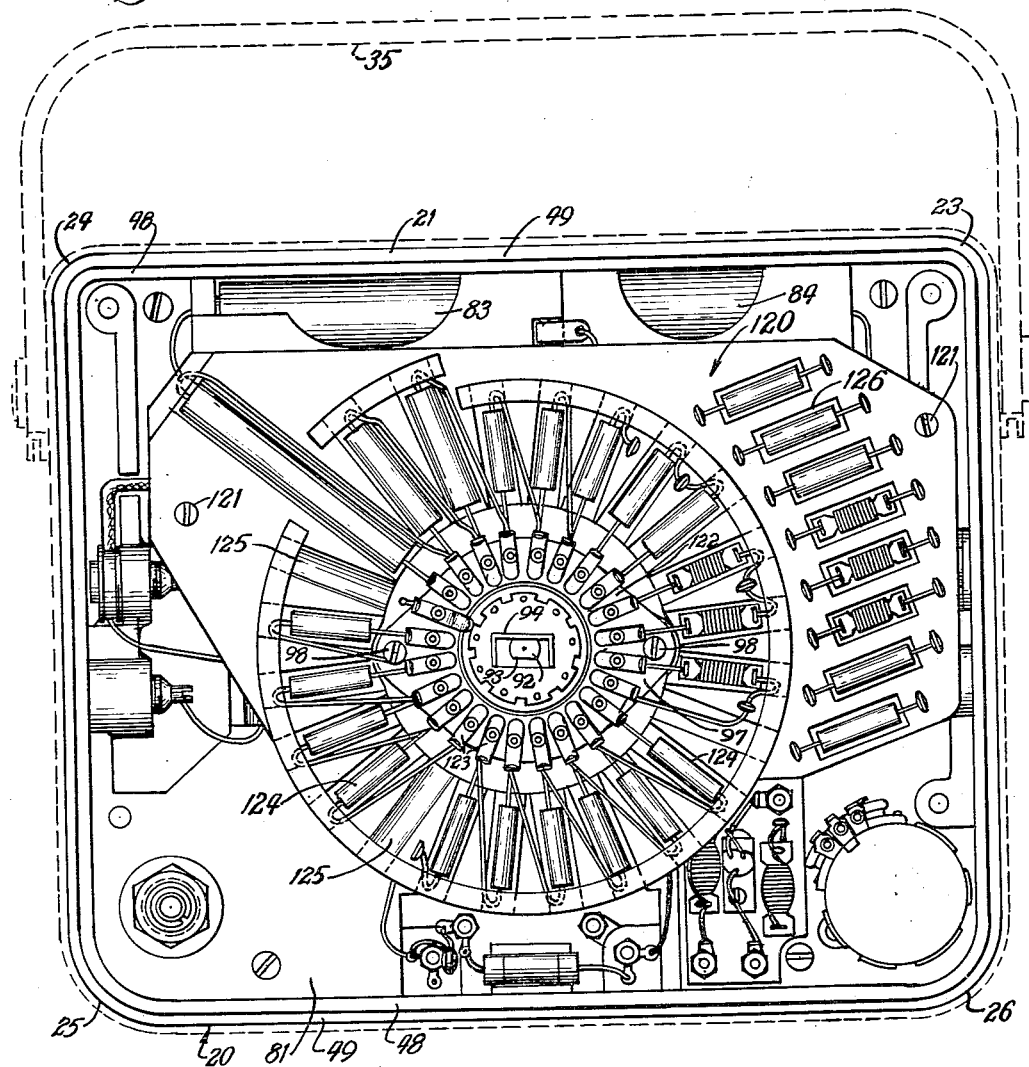
Fig. 5 is a rear elevational view of the assembly of Fig. 1, with the rear cover removed, taken on the plane of the line 5—5 of Fig. 4.

Referring to Figs. 1 and 2, the present instrument is preferably housed in a housing 20, which includes a front cover plate 21 and a rear housing member 22.

The housing is preferably molded of a suitable insulating molding compound and both these parts are substantially rectangular in plan but provided with rounded corners 23, 24, 25, 26, on the lateral corners. The front and rear corners are also rounded, as indicated at 27—29, Fig. 2.

The housing member 22 includes a top wall 30, which may be substantially plane, a bottom wall 31, Fig. 2, and side walls 32, 33, Fig. 3. The side walls 32, 33 are provided with threaded bolts 34, projecting laterally from each side wall and threaded into metal inserts in the side walls for providing a support for an extruded plastic, flexible handle 35, which is slotted and apertured at each end for passing the heads 36 of the screw bolts 34 in the attachment of the handle to the housing.

The top, bottom and side walls of the housing member 22 are relatively thick, and at their forward edges 37 the walls of housing member 22 are provided with a forwardly projecting rectangular rib 38, for definitely locating the cover plate 21 on the housing.

Cover member 21 has a front wall 39, which is substantially plane except for its two lower corners, Fig. 1, where the cover 21 has depressed plane portions 40, 41, bordered by curved walls 42 and 43.

The depressed plane portions 40, 41 provide places for mounting adjustment knobs 44 and 45, each on a suitable shaft for a purpose further to be described.

The front cover 21 is provided with a rectangular window opening 46, bounded by a beveled edge 47 on four sides, the window opening being rectangular and of greater width side to side than its up and down dimension, as seen in Fig. 1. This provides ample space for an especially large dial plate provided with scale indicia for the movement.

The cover plate 21 has a plane edge surface 48, located to engage the edge of the rib 38 on the housing 22, and the cover 21 has a rearwardly projecting, rectangular rib 49, which fits against the edge 37 of the housing 22, and surrounds the rectangular rib 38 of the housing.

Thus the two housing parts are adapted to exclude dust and form a substantially air tight closure. Cover plate 21 is provided with a through bore 50 adjacent its lower wall for receiving the zero adjustment member 51, which is located in the bore 50 and has a countersunk head 52, provided with a screw driver slot.

A retaining ring 53 is mounted on a rib 54 on the zero adjustment member to act as a thrust bar and hold this member in assembly with the cover 21. The zero adjustment member has a cylindrical body 55 which projects through an aperture 56 in a window plate 57; and the zero adjustment member 51 has an eccentric, axially extending pin 58 which acts on a fork carried by the instrument movement to accomplish a zero adjustment.

The window plate 57 may comprise a transparent, plastic molded member made out of a suitable plastic, such as that sold under the name "Lucite," and it is provided with a flat rectangular portion 59 which is slightly larger than the window opening 46, and which is adapted to be seated in a rectangular recess indicated at 60 on the inside of the cover member 21.

At its border the flat portion 59 is provided with a rearwardly extending integral wall 61, 62, Fig. 2, which is attached to a border flange 63 that fits in an angular recess 64, formed in the cover plate 21.

The external border 65 of the flange 63 is rectangular so that the window plate fits inside the cover 21.

The next member 66 in the cover 21 is a meter movement supporting subpanel and this subpanel is substantially rectangular in shape so that it fits against the inner rectangular wall 67 of the cover 21 and it is provided with a large rectangular plane portion 68, located behind the window opening 46 and window 57 for supporting the dial behind the pointer 69 of the instrument movement indicated at 70.

The movement supporting subpanel 66 is provided with a cylindrical meter housing 71 integrally molded with the panel 66, and provided with a cylindrical socket 72. This fits the cylindrical outer surface 73 of the movement 70, which surface is carried by a plurality of yoke members of paramagnetic metal.

The dial plate 74 is confined in a rabbetted recess 75 in the rear of the window plate 57 and is held there by being clamped between the subpanel 66 and the window plate 57.

The dial plate 74 is provided with a circular aperture 76 for exposing the head 77 of an indexing gear, which is provided with a pointer 78, Fig. 1, on its face, registering with indicia and scale divisions located about the circular aperture 76.

These scale divisions and indicia relate to various ranges of the instrument in volts, D. C. or A. C., amperes or milliamperes as indicated.

The indicia surrounding the center aperture 76 may be on a separate, smaller dial plate 79, which is clamped behind the dial plate 74 against the subpanel 66, as seen in Fig. 2, and the shape of which is seen in Fig. 1.

The dial plate 74 is provided on its face with an arcuate scale including a plurality of arcs provided with suitable scale divisions and numbers for indicating measurements of volts A. C. or D. C., ohms or current, and the arcuate scale 80 on the dial plate 74 is formed on a center corresponding to the axis of rotation of the instrument.

The dial plate may contain any other suitable useful indicia, as shown, regarding the characteristics of the instrument, and the indicia surrounding the circular aperture 76 is arranged to cooperate with those shown on the arcuate scale 80.

The knob 44 at the left of Fig. 1 may actuate a suitable potentiometer, while the knob 45 may actuate a selector switch.

Referring to Fig. 2, the housing 22 encloses a subpanel 81, which is shown in plan in Fig. 9, and which has plane forward edge portions 82 engaging the subpanel 66.

Panel 81 is formed with molded sockets 83, 84, at its upper end, Fig. 9, and provided with suitable spring pressed contacts 85 and 86, and with contacts 87 and 88 for engaging the other end of each cell.

The subpanel 81 has a circular cutout at 89 fitting around the instrument well 71 and it is provided with a central bore 90 for supporting a suitable bearing assembly 91 for the shaft 92, which carries the indicator gear 77.

Figure 6:
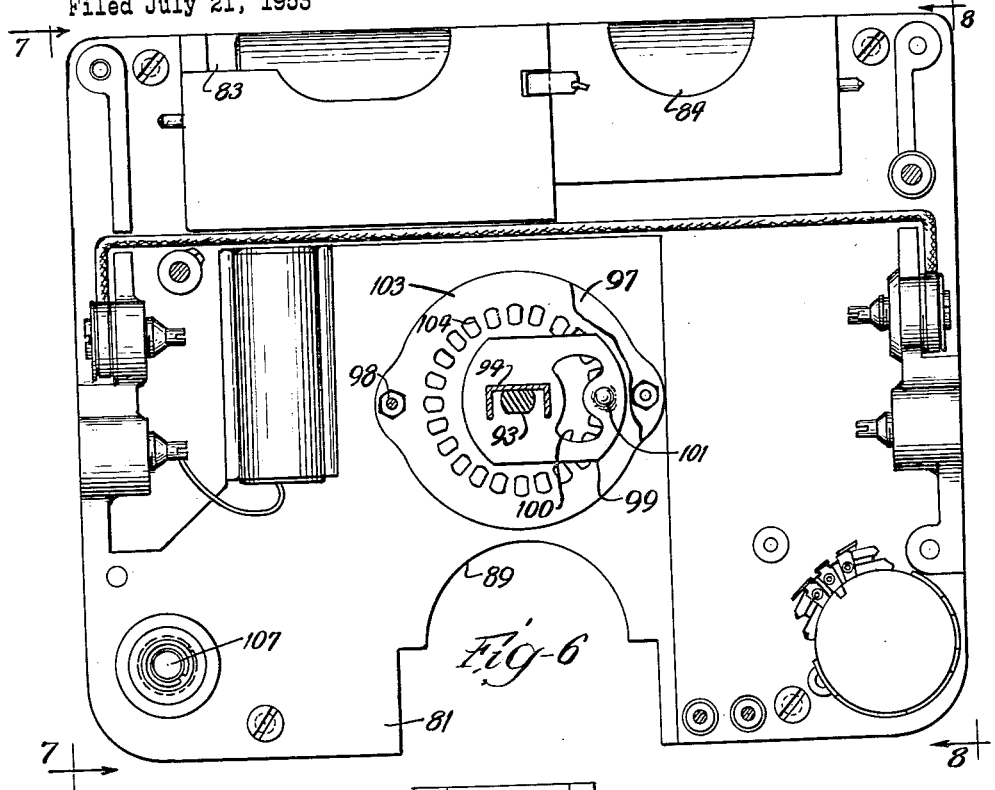
Fig. 6 is a rear elevational view of a subpanel assembly.
Figures 7, 8:
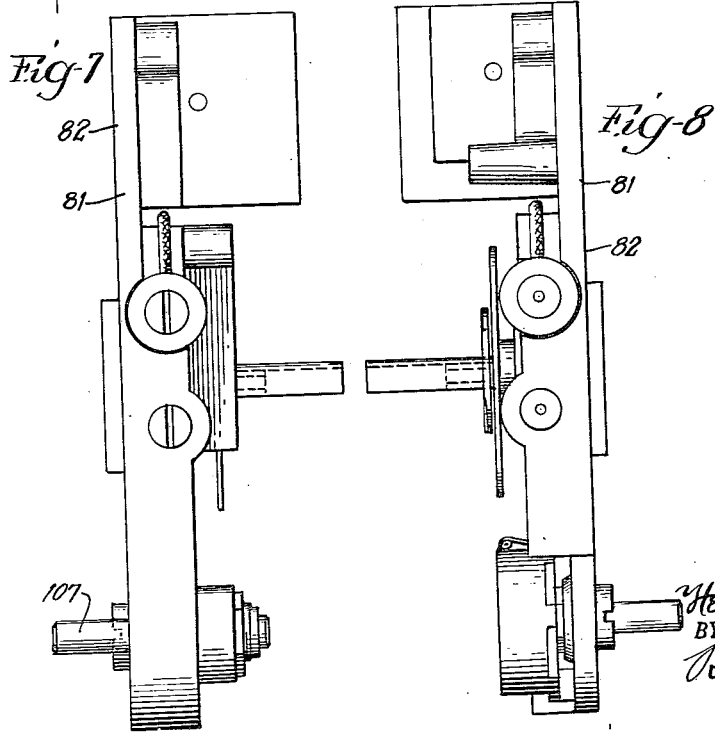
Fig. 7 is a side elevational view taken on the plane of the line 7—7 of Fig. 6, looking in the direction of the arrows.
Fig. 8 is a side elevational view taken on the plane of the line 8—8 of Fig. 6, looking in the direction of the arrows.

The shaft 92 has a rearwardly extended flattened end portion 93, Fig. 6, which is so formed that it can be secured to a channeled member 94 mounting a plurality of insulating switch discs 95, 96.

Any number of switch discs may be employed to rotate with the shaft 92 and to cooperate with fixed switch contacts carried by insulating switch plates 97, which are mounted upon suitable bolts 98 provided with spacers.

The channeled member 94 carries a resilient indexing spring 99, which is cut away at 100 to increase its flexibility and is provided with a partially spherical socket at 101 for receiving the indexing ball 102.

Indexing ball 102 is pressed against the insulating indexing plate 103 by spring 99, and the ball 102 is seated in any one of a multiplicity of circular apertures 104, located in a circle in the index plate 103.

When the shaft 92 is rotated the edges of the aperture 104, which then engages the ball 102, tend to cam the ball 102 backward against the spring 99, until the ball rides at the same radius on the plane rear surface of the indexing disc 103, and this continues until the ball drops into the next aperture.

The apertures 104 are so located that they determine the successive positions of the switch corresponding to that indicated by the pointer 78, and the index ball 102 holds the indicator and the switch definitely in its successive positions.

The single index ball 102 may be used for a multiplicity of rotating switch plates 95, 96, cooperating with a multiplicity of fixed switch plates 97, controlling the various elements of the circuit which are required for cutting in or cutting out multipliers, resistors, or other electrical constants by means of which this instrument may accomplish all of the measurements shown on its dial indicia.

The circuits, by means of which multipliers and other electrical constants are connected with a meter to accomplish certain measurements are well known to those skilled in the art and need not be shown here.

Referring to Fig. 9, this shows the indicator gear wheel 77, mounted on shaft 92 and driven by chain 105 from a driving gear wheel 106, carried by shaft 107. Both the gear wheels 77 and 106 are provided with a peripheral rim 108 and 109, Fig. 1, of substantially cylindrical form but having a multiplicity of rectangular teeth 110 projecting radially therefrom.

These teeth 110 are separated by U-shaped grooves 111, and the teeth have tapered side walls 112 and tapered end walls 113. The teeth are adapted to fit in the substantially rectangular recesses 114 of the links 115 of chain 105.

Each link is substantially the shape of a rectangular U having a straight yoke 116 and two straight legs 117, 118. Each leg has a curved portion 119, forming a hinge about the yoke 116 of the next link.

The width of the links between the curved portions is such that the legs 117, 118 and the curved portions 119 are disposed on opposite sides of the teeth 110. The yokes 116 fall in the grooves 111.

The arrangement is such that there is very little looseness, and indexer apertures 104 are located far enough apart so that the switch positions are definitely separated from each other.

Referring to Fig. 1, the knob 45 is carried by the shaft 107 on the outside of the housing, and thus the shaft 107 may be rotated at will to rotate the gear 106, move the chain 105 and rotate the gear wheel 77, the exposed part of which bears the pointer 78.

Rotation can then be accomplished until the pointer 78 rests beside the range or indicia which the user desires to employ. At the same time the shaft 92 causes the switch discs 95, 96 to rotate and to establish the circuits which include the multipliers, shunts or other electrical constants which are essential for that range of the instrument.

Referring to Fig. 5, this shows the resistor supporting subpanel 120, which is provided with support on the other panels by means of a plurality of screw bolts 121, and is arranged about a fixed switch disc 122, having a multiplicity of contacts 123 in such manner that a multiplicity of recesses for multiplier coils 124 may be arranged extending radially toward the contacts 123.

One of the rotating switch discs 96 is shown engaging one of the contacts, and any of the contacts may be brought into circuit by rotating the shaft 92.

Sockets 125 are provided for receiving the electrical units which are arranged for convenient connection, and additional sockets 126 may be arranged outside the section of multipliers.

The cover 21 and housing 22 are secured together on the assembly by a plurality of screw bolts such as that shown at 127, Fig. 4.

Referring to Fig. 12, this is a sectional view taken through a meter movement preferably used in the instrument. The meter movement comprises a suitable molded base 128, provided with a transverse bridge 129 below the movement and another transverse bridge 130 above the movement.

The lower bridge carries a threaded jewel supporting screw 131, the jewel being indicated at 132 and serving as the lower bearing for a spindle 133.

The screw 131 also carries a spring bracket 134 which is clamped in place by a nut 135 and which supports one end 136 of a spring 137, the other end of which is secured to the moving coil at 138.

The moving coil 139 comprises a substantially rectangular coil of a multiplicity of turns of fine insulated wire mounted on a spool or cemented together and provided at each end with a pintle post 140, 141, axially secured by cement to the coil.

Pintle post 140 carries the pintle 133 and the spring bracket 142. Upper pintle post 141 carries a pintle 143, mounted in jewel 144, carried by screw 145. Pintle post 141 carries the pointer 69, which is rotated on the pintles 143, 133, by the coil 139.

Pointer 69 has an upward offset at 146 and extends through an aperture 147 in the dial plate 74, and thereafter has a long radially extending portion 148. At its opposite end pointer 69 has three radially extending balance arms 149, each of which carries a wire coil 150, serving as a balance weight and held in adjustment by a spring 151.

Upper screw 145 also carried the zero adjustment bracket 152, which is clamped by means of a spring washer 153 and nut 154. The zero adjustment bracket supports one end of a spiral spring at 155. The other end is carried by the moving coil bracket at 156.

Zero adjustment bracket 152 has a bifurcated end 157 engaged by an eccentric pin 58, which is carried by screw 51 (Fig. 2).

The base 128 supports a magnetic field assembly which comprises an external circular yoke 158, which shields the instrument and provides a path for the external flux. This annular yoke 158 is made of paramagnetic material, such as soft iron or steel, and is spaced by an air gap from the annular pole piece 160 of the same material.

The annular pole piece 160 is brazed or otherwise integrally secured to a cylindrical core 161, which is made of paramagnetic material of high coercive force, such as that sold under the name of "Alnico."

The core 161 is magnetized transversely to its axis in the direction of a diameter so that flux emerges from one side of the cylinder 161 at a North Pole and enters the other side at a South Pole.

The yoke 158 is secured to the base by means of through screw bolts 162, of which there are two located diametrically opposite to each other. The pole piece 160 and the core carried by it are secured to the base by means of a pair of through bolts 163. Thus the rigidity of the assembly and the uniformity of the air gap 159 is assured; and the sole magnetomotive force is the magnetic core 161, which is shielded by the yoke 158.

The exact structure of the electric movement may be substantially as described in my prior application, Ser. No. 346,833, filed April 6, 1953, for Electrical Instrument With Core Magnet Movement, which is hereby incorporated by reference thereto.

The operation of the present instrument will be apparent from the description of its parts.

The meter movement operates in the usual way, rotating the pointer through an arc which is proportional to the amount of current passing through its coils. The movement may be employed for different ranges, as indicated on the dial, by the use of suitable shunts, multipliers and other electrical constants, each of which may be brought into circuit by rotating the knob 45, which moves the pointer 78 to indicate the range in circuit.

It is then necessary for the operator to refer to the proper scale divisions on the dial 80 for making his reading with the pointer.

The present instrument is more adaptable to changes in the art of measuring by virtue of the fact that all of its indicia is impressed upon a dial plate which may be printed, and none of the indicia is molded on the housing.

The present chain and gear wheel drive assures a positive actuation of the switches, and the present indexer assures the location of the switch contacts in their proper position. Thus a single instrument movement may be employed for a multiplicity of different uses; and the cost of providing instruments for measurement of a multiplicity of different electrical characteristics is substantially reduced to the ultimate purchaser.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a multiple scale meter assembly, the combination of a cover plate having a window opening and having a substantially rectangular border flange, the said window opening being provided with an angular recess around its border, said opening being substantially rectangular, a transparent plastic window member of substantially rectangular shape formed with a forwardly projecting rectangular portion adapted to be received in said angular recess and closing said window opening, said cover having a second angular recess for receiving another part of said window member, and said window member having an outwardly projecting flange receivable in said latter recess, said window member being provided with an angular recess in its rear edge and a dial plate receivable in said recess and clamped therein by a movement supporting panel.

2. In a multiple scale meter assembly, the combination of a cover plate having a window opening and having a substantially rectangular border flange, the said window opening being provided with an angular recess around its border, said opening being substantially rectangular, a transparent plastic window member of substantially rectangular shape formed with a forwardly projecting rectangular portion adapted to be received in said angular recess and closing said window opening, said cover having a second angular recess for receiving another part of said window member, and said window member having an outwardly projecting flange receivable in said latter recess, said window member being provided with an angular recess in its rear edge and a dial plate receivable in said recess and clamped therein by a movement supporting panel, said movement supporting panel having a central opening and a scale surrounding said central opening for indicating any of a plurality of switch positions.

3. In a multiple scale meter assembly, the combination of a cover plate having a window opening and having a substantially rectangular border flange, the said window opening being provided with an angular recess around its border, said opening being substantially rectangular, a transparent plastic window member of substantially rectangular shape formed with a forwardly projecting rectangular portion adapted to be received in said angular recess and closing said window opening, said cover having a second angular recess for receiving another part of said window member, and said window member having an outwardly projecting flange receivable in said latter recess, said window member being provided with an angular recess in its rear edge and a dial plate receivable in said recess and clamped therein by a movement supporting panel, said movement supporting panel having a central opening and a scale surrounding said central opening for indicating any of a plurality of switch positions, a switch supporting panel engaging said movement panel, said switch supporting panel having a shaft centrally located with respect to said opening and having a driving sprocket provided with a pointer located behind said opening.

4. In a multiple scale meter assembly, the combination of a cover plate having a window opening and having a substantially rectangular border flange, the said window opening being provided with an angular recess around its border, said opening being substantially rectangular, a transparent plastic window member of substantially rectangular shape formed with a forwardly projecting rectangular portion adapted to be received in said angular recess and closing said window opening, said cover having a second angular recess for receiving another part of said window member, and said window member having an outwardly projecting flange receivable in said latter recess, said window member being provided with an angular recess in its rear edge and a dial plate receivable in said recess and clamped therein by a movement supporting panel, said movement supporting panel having a central opening and a scale surrounding said central opening for indicating any of a plurality of switch positions, a switch supporting panel engaging said movement panel, said switch supporting panel having a shaft centrally located with respect to said opening and having a driving sprocket provided with a pointer located behind said opening, a plurality of fixed contact discs and a plurality of rotatable contact members mounted on said shaft, and indexing means for holding said shaft in any one of a plurality of rotative contact engaging positions.

5. In a multiple scale meter assembly, the combination of a cover plate having a window opening and having a substantially rectangular border flange, the said window opening being provided with an angular recess around its border, said opening being substantially rectangular, a transparent plastic window member of substantially rectangular shape formed with a forwardly projecting rectangular portion adapted to be received in said angular recess and closing said window opening, said cover having a second angular recess for receiving another part of said window member, and said window member having an outwardly projecting flange receivable in said latter recess, said window member being provided with an angular recess in its rear edge and a dial plate receivable in said recess and clamped therein by a movement supporting panel, said movement supporting panel having a central opening and a scale surrounding said central opening for indicating any of a plurality of switch positions, a switch supporting panel engaging said movement panel, said switch supporting panel having a shaft centrally located with respect to said opening and having a driving sprocket provided with a pointer located behind said opening, a plurality of fixed contact discs and a plurality of rotatable contact members mounted on said shaft, and indexing means for holding said shaft in any one of a plurality of rotative contact engaging positions, said indexing means comprising a fixed disc having a plurality of apertures arranged in a circle and a rotatable member mounted on said shaft and provided with a spring pressed ball for engaging in any of said apertures to hold the shaft in various positions.

References Cited in the file of this patent
UNITED STATES PATENTS

| 1,776,793 | Miller | Sept. 30, 1930 |
| 2,607,812 | Lederer | Aug. 19, 1952 |
| 2,651,755 | Triplett | Sept. 8, 1953 |

FOREIGN PATENTS

| 608,189 | Great Britain | Sept. 10, 1948 |